US005568769A

United States Patent [19]

Leuerer

[11] Patent Number: 5,568,769

[45] Date of Patent: Oct. 29, 1996

[54] PROCESS FOR INFLUENCING THE OPTICAL DENSITY OF A PRINTING INK LAYER ON A PRINT CARRIER

[75] Inventor: Dietrich R. K. Leuerer, Würzburg, Germany

[73] Assignee: Koenit & Bauer Aktiengesellschaft, Wurzburg, Germany

[21] Appl. No.: 424,468

[22] PCT Filed: Nov. 12, 1993

[86] PCT No.: PCT/DE93/01083

§ 371 Date: May 9, 1995

§ 102(e) Date: May 9, 1995

[87] PCT Pub. No.: WO94/11192

PCT Pub. Date: May 26, 1994

[30] Foreign Application Priority Data

Nov. 14, 1992 [DE] Germany .......................... 42 38 557.1

[51] Int. Cl.[6] .............................. B41F 7/24; G01B 11/00

[52] U.S. Cl. ........................................ 101/450.1; 101/148

[58] Field of Search .................................... 101/147, 148, 101/484, 483, 365, 350, 450.1, 4511; 364/526, 552, 551.01, 558; 356/448, 446

[56] References Cited

U.S. PATENT DOCUMENTS

| | | | |
|---|---|---|---|
| 4,881,182 | 11/1989 | Hank et al. . | |
| 4,972,774 | 11/1990 | MacPhee | 101/450.1 |
| 5,090,316 | 2/1992 | Rodi et al. . | |

FOREIGN PATENT DOCUMENTS

| | | |
|---|---|---|
| 0386489 | 9/1990 | European Pat. Off. . |
| 0393365 | 10/1990 | European Pat. Off. . |
| 0443062 | 8/1991 | European Pat. Off. . |
| 0505323 | 9/1992 | European Pat. Off. . |
| 3140760 | 8/1982 | Germany . |
| 3444892 | 6/1986 | Germany . |
| 3830732 | 3/1990 | Germany . |

*Primary Examiner*—J. Reed Fisher

*Attorney, Agent, or Firm*—Jones, Tullar & Cooper, P.C.

[57] ABSTRACT

A process for affecting the ink value or colorimetric density of a printing ink layer on a substrate compares a production value in a microprocessor with a set value previously supplied to the microprocessor. Deviations of the production ink values or colorimetric values from the set values which exceed a pre-selected threshold will generate a signal that will change the rotational speed of a moistening device to reduce the difference between the production value and the set value.

3 Claims, 2 Drawing Sheets

PROCESS FOR INFLUENCING THE OPTICAL DENSITY OF A PRINTING INK LAYER ON A PRINT CARRIER

FIELD OF THE INVENTION

The invention relates to a process for influencing or affecting the ink density of a printing ink layer on a printing substrate or a print carrier.

DESCRIPTION OF THE PRIOR ART

A process for monitoring the moistening supply in offset printing presses is known from DE 38 30 732 A1, by means of which not yet printed or printed surfaces, in the area of the edges of, or on predetermined colored surfaces are scanned by means of an opto-electrical converter and the signals generated in the course of this scanning are evaluated.

This process is disadvantageous in that the signals for changing the amount of moistener are only triggered when scumming occurs on a full-tone surface of the measuring field. This has the result that the quality of the pieces printed up to the removal of the printed control sheet is already reduced.

SUMMARY OF THE INVENTION

It is the object of the present invention to provide a process for evaluating fluctuations in the ink density in an offset rotary printing press.

The ink density or colorimetric value of a plurality of coloration and position defined ink spots on a printed surface is measured. This ink density or colorimetric value for each spot is then stored in a microprocessor as a plurality of set values which will define a good or acceptable level of ink density. During the operation of a printing press, the ink density or colorimetric values of the selected, positions defined measuring spots on the substrate to be checked, are measured. These production values are also entered into the microprocessor and the differences between these production values and the previously supplied set values are compared. If it is determined that the deviation of the production values from the set values has exceeded a certain level, the microprocessor will generate a signal that is used to control the rotational speed of a motor driving a moistener. The speed of rotation of the moistener will thereby be increased or decreased to decrease or increase the ink density or colorimetric value of the printing ink applied to the substrate.

The following advantages in particular ensue from the attainment of the object in accordance with the invention. As a result of the determination of the ink density over several adjoining zones, it is possible to maintain the ink density values constant or to evaluate these ink density values in a downstream-connected logical device, by means of which the amount of moistener can be continuously regulated. A signal for changing the amount of moistener is generated in this way prior to reaching the scumming threshold, so that for this reasons a lack in quality is avoided during printing. It is possible to give the operators or the automatic ink density control a hint or a signal whether and in which direction it is necessary to change the amount of moistener or the amount of ink in order to achieve a desired ink density again. Thus the process makes the detection of reasons for ink density changes in the coloration on a printing substrate easier.

BRIEF DESCRIPTION OF THE DRAWINGS

The invention will be explained in detail below by means of an exemplary embodiment. The associated drawings show in.

DESCRIPTION OF THE PREFERRED EMBODIMENT

Figure 1:
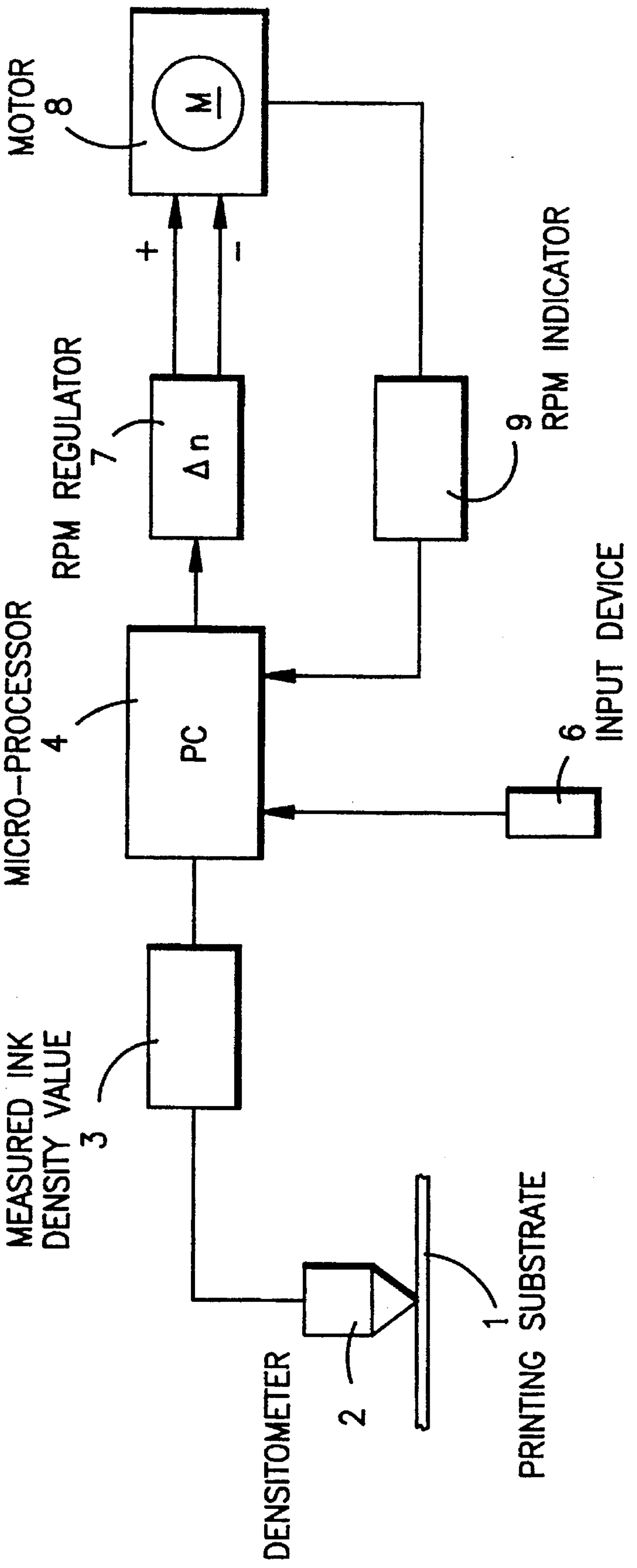
FIG. 1, a block wiring diagram of the arrangement of the device.
Figure 2:
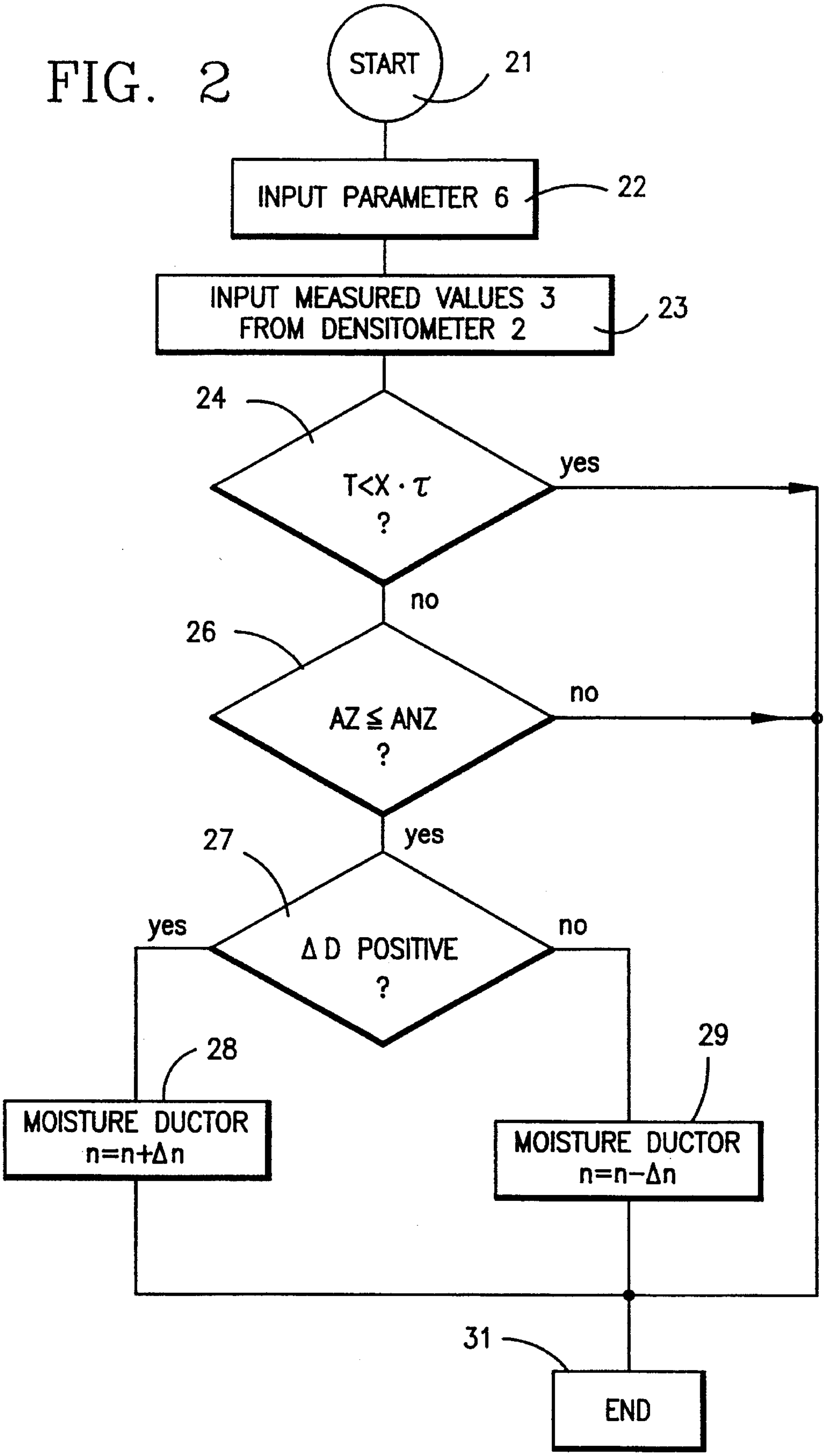
FIG. 2, a process flow chart in accordance with the present invention.

The ink density of a printing ink layer of, for example an ink color control strip applied to a printing substrate 1, for example a printed sheet, and which may extend crosswise to the direction of movement of the printing substrate 1 and which has a plurality of measuring fields (measuring spots= with a standardized measuring surface) is measured by means of a densitometer or colorimetric measuring device 2. However, these can also be suitable measuring spots from the subject which may be printed crosswise to the direction of rotation of the printing substrate 1. A coloring zone of the colorization involved, for example "magenta", is produced in full tone and in several raster tones. The ink density or colorimetric measured value 3 of these coloring zones is stored in a microprocessor 4, for example a computer with a memory and with input and output units, as values indicative of their position on the printing substrate 1 and their value. At the same time, additional selectable parameters or input values are or may be entered in the microprocessor 4 via an input keyboard 6. However, it is also possible to enter the exact coordinates of the position of the measuring spots and the associated ink density or colorimetric values with their permissible tolerance. In this way it is possible to take over values from prior productions. By means of process steps which will be explained below, the amount of moistener applied can be changed by effecting an increase or decrease of the rpm of the moisture ductor, not shown, driven by a motor 8. The rpm of a motor 8, for example a d.c.-motor, is detected by an rpm indicator 9 and its measuring values are supply to the microprocessor 4 as an actual value.

In a first process step 21, an operator enters a start signal, for example on the input keyboard of the microprocessor 4. Subsequently the input from the input device 6, as controlled by the operator takes place in a second process step 22. In addition to being usable in the above mentioned manner, such input devices 6 can also be used to enter information such as the number of adjoining zones AZ whose ink density change should be simultaneously evaluated, for example eleven such adjoining zones of one of several colorations; the time constant $\tau$ for the length of the machine build-up time, for example 50 sheets, and the multiplier $\times$ for the time constant $\tau$, for example 4. However, the preselectable input devices 6 mentioned can also be temporarily stored in the microprocessor 4.

Thereafter, the actual printed ink density or colorimetric values on the print carrier, as provided by the densitometer 3 for a printing substrate 2 to be checked are supplied to the microprocessor 4 in a third process step 23. The third process step 23 can take place at the same time as the previously described process step 22. Such measured values are the number of printed sheets T since the last ink-moisture change; the number of adjoining zones with changed ink density or colorimetric values ANZ; and a zonal density change Delta D. In a further process step 24, the number of sheets during the period T following the last ink-moisture change is checked.

In case the time period T since the last ink-moisture change is less than × times τ, for example at least four times 50 sheets, the process is terminated. Otherwise, as a rule after 200 sheets, it is determined, in a following process step 26, whether the number of the preselected adjoining zones AZ of one coloration is less than or equal to the number ANZ of the adjoining measured zones with changed ink density or colorimetric values. In this case there is no reason to continue the process. If the ink density value during process step 26 has changed only in a few adjoining zones or only in one zone, the logical conclusion is drawn from this, provided there is no zonal moistening unit, that there is no moisture difference. In this case the process is terminated. Otherwise, namely when the number ANZ of adjoining zones with changed ink density is greater than, for example, eleven adjoining zones of the same color with ink density or colorimetric value deviations (measuring threshold) in the same direction, an ink density or colorimetric value change, Delta D, is brought about in a further process step 27. The ink density or colorimetric value change, Delta D, is brought about in such a way that either, with too high an ink density or colorimetric value the rpm n of the moisture ductor motor 8 and thus the rpm n of the moisture ductor are increased in a process step 28 or, with too low an ink density or colorimetric value, the rpm of the moisture ductor motor 8 and thus the rpm of the moisture ductor are decreased in a process step 29, for example by an adjustment value of 1%, so that in the first case more moistener and in the second case less moistener is supplied. If it was determined that the ink density or the colorimetric value deviation is based on a moistener difference and if an rpm change of the moisture ductor has taken place, it is possible to considerably reduce the time period T because of the knowledge that a small moistener change in a few printed specimens results in a densitometrically detectable density change. The zone with the greatest ink density or colorimetric deviation is taken as the control value. The process is now terminated in a process step 31.

This method is suitable for the regulation of zonal moistening units as well as for correcting the moisture in measuring systems operating in accordance with colorimetric principles and are therefore no longer tied to a measuring field. In this case it is necessary to assure, in connection with the entire number of zones of all colors employed for comparison, that neither a color nor moisture was changed.

Not only paper sheets and webs are to be considered as printing substrates in the sense of this invention. Rubber blankets and clamped printing plates with an ink layer can also be considered as printing substrates.

In summary it can be stated, that the process in accordance with the present invention is a process for measuring and affecting the ink density or colorimetric values of a printing ink layer on a printing substrate. In the course of this, the ink density, or the colorimetric value of a plurality of coloration and position-defined measuring spots on a printed substrate, i.e. one having an ink layer, is measured. The ink density or colorimetric value for each coloration, for example "magenta", is predetermined for each selected measuring spot of an ink layer on a printing substrate for a plurality of position-defined selected measuring spots. These ink density or colorimetric values are stored as set values, can have been measured on a printed substrate that has been identified as good, or can also be the result of purely measured values from completed print jobs. These set values can be supplied to a microprocessor and can be stored there. Thus, a statement regarding the set value and position on a printing substrate and the permissible ink density or colorimetric value, with or without a permissible tolerance, is available for each one of the ink density or colorimetric values. Subsequently, the ink density or colorimetric values of the selected, position-defined measuring spots on a substrate carrying ink which is to be checked, are measured and stored. These production values are compared with the ink density or colorimetric set values associated with them and the detected ink density or colorimetric deviations from the ink density or colorimetric set values are temporarily stored with respect to value and position in the memory of the microprocessor. From these ink density or colorimetric deviation values, it is subsequently determined by means of an evaluation algorithm in the microprocessor whether continuous rows of several adjoining measuring spots with ink density or colorimetric deviations in the same direction (± direction) have been formed. The continuous rows detected in this manner are investigated to determine whether they correspond to the required number of adjoining measuring spots with the same ink density or colorimetric deviations. Thereafter, if there are one or several rows of measuring spots with ink density or colorimetric deviations in the same direction and predetermined quantity of the directly adjoining measuring spots, an electronic signal is generated by the microprocessor and an output signal is formed. This signal can be employed for generating indications for an operator with instructions to either increase or reduce the amounts of moistener in the plus or minus direction in accordance with the ink density or colorimetric deviations. This electronic signal can also be supplied to a control of a drive of a motor moistener feed device in order to then make the electric motor drive of the device for the amount of moistener run faster or slower. It is possible to issue a second signal simultaneously with this electronic signal, which orders the operator as well as a feed device for amounts of ink not to change the amount of printing ink feeding.

If none of the above described rows is detected, the microprocessor generates an order to change the amount of printing ink accordingly.

I claim:

1. A process for affecting the ink density or colorimetric value of a printing ink layer on a printing substrate including the steps of:

providing a plurality of ink density or colorimetric value and position defining set value measuring spots of acceptable values;

determining the ink density or colorimetric value for a coloration for each selected one of said plurality of set value measuring spots;

providing a microprocessor having an input device and outputs and a memory;

storing said ink density or colorimetric value for each of said selected ones of said set value measuring spots as set values in said microprocessor;

producing a plurality of ink density or colorimetric value and position defining production value measuring spots on an ink carrying substrate which is to be checked;

measuring said ink density or colorimetric value for each of said production value measuring spots as production values;

entering said production values in said microprocessor and comparing said production values with said set values;

determining in said microprocessor if continuous rows of several adjoining production value measuring spots with ink density or colorimetric values which deviate from said set values have been formed;

providing a moistener device with a controllable electric motor; and generating an electronic signal to said moistening device in response to said determination that said production values deviate from said set values to change an amount of moistener introduced by said moistener device.

2. The process of claim 1 further including the steps of determining if said deviations of said continuous rows of said several adjoining production value measuring spots are in the same direction and changing only said moistener device while leaving an amount of printing ink supplied unchanged.

3. The process of claim 1 further including the steps of changing a printing ink supply when said microprocessor senses an absence of said continuous rows of said production value measuring spots.

* * * * *